(12) United States Patent
Oren-Dahan

(10) Patent No.: US 8,762,447 B2
(45) Date of Patent: Jun. 24, 2014

(54) SYSTEM AND METHOD TO SECURE COMMUNICATIONS OVER A PUBLIC NETWORK

(75) Inventor: Ofir Oren-Dahan, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 1399 days.

(21) Appl. No.: 12/114,118

(22) Filed: May 2, 2008

(65) Prior Publication Data

US 2009/0323718 A1    Dec. 31, 2009

(51) Int. Cl.
*G06F 15/16* (2006.01)

(52) U.S. Cl.
USPC .............................. 709/203; 726/14; 726/15

(58) Field of Classification Search
USPC ................ 709/203, 230; 726/14–15
See application file for complete search history.

(56) References Cited

U.S. PATENT DOCUMENTS

| | | | | |
|---|---|---|---|---|
| 7,124,189 B2 * | 10/2006 | Summers et al. | ............. | 709/227 |
| 8,060,058 B2 * | 11/2011 | Ch'ng et al. | ................. | 455/411 |
| 2003/0009571 A1 * | 1/2003 | Bavadekar | ..................... | 709/230 |
| 2003/0167403 A1 * | 9/2003 | McCurley et al. | ............ | 713/201 |
| 2003/0217149 A1 * | 11/2003 | Crichton et al. | ................. | 709/225 |
| 2004/0225895 A1 * | 11/2004 | Mukherjee et al. | ........... | 713/201 |
| 2006/0005240 A1 * | 1/2006 | Sundarrajan et al. | ........... | 726/15 |
| 2006/0187942 A1 * | 8/2006 | Mizutani et al. | ............... | 370/401 |
| 2007/0174454 A1 * | 7/2007 | Mitchell et al. | ................. | 709/225 |
| 2007/0247395 A1 * | 10/2007 | Barraclough et al. | .......... | 345/51 |
| 2008/0037557 A1 * | 2/2008 | Fujita et al. | .............. | 370/395.53 |
| 2008/0151917 A1 * | 6/2008 | Bartlett et al. | ................. | 370/401 |
| 2009/0170475 A1 * | 7/2009 | Ch'ng et al. | ................... | 455/411 |
| 2010/0037311 A1 * | 2/2010 | He et al. | ........................... | 726/15 |
| 2010/0064133 A1 * | 3/2010 | Martin et al. | ................. | 713/154 |

* cited by examiner

*Primary Examiner* — Duyen Doan
(74) *Attorney, Agent, or Firm* — Fletcher Yoder, P.C.

(57) ABSTRACT

Systems, methods and apparatus are provided through which in some aspects a method to provide secure communications between a plurality of computers over a public network includes establishing a connection over the public network between the plurality of computers by mimicking hypertext transport protocol (HTTP) enterprise tunnel (HET) server protocol and changing the connection to a multiplexing protocol.

20 Claims, 15 Drawing Sheets

SYSTEM AND METHOD TO SECURE COMMUNICATIONS OVER A PUBLIC NETWORK

FIELD OF THE INVENTION

This invention relates generally to computer communications, and more particularly to securing communications over a public network.

BACKGROUND OF THE INVENTION

Conventional communications systems provide several alternatives for confidential client-server communication over public networks.

In computer communications, tunneling is used to carry internet protocol (IP) packets inside of IP packets across a communications tunnel destined for an endpoint of the tunnel. In tunneling, encapsulation of a packet within a packet is performed by adding an outer IP header before the original IP header. Between the outer IP header and the original IP header are any other headers for the path, such as security headers specific to the tunnel configuration. When a packet reaches either endpoint, the tunnel's IP header and any additional tunnel headers are stripped off, and the original IP packet is injected into the IP stack of the tunnel endpoint.

In some systems, a virtual private network (VPN) IP security (IPSEC) is established between two networks, which links the two networks together. Some security options that are implemented on networks include secure shell (SSH) and OpenVPN, both of which multiplex all communication over a single IP port. Both SSH and OpenVPN require a firewall rule to allow incoming communications.

Conventional systems also sometimes implement a hypertext transport protocol (HTTP) enterprise tunnel (HET).

BRIEF DESCRIPTION OF THE INVENTION

A technical effect of aspects of the system and method and described herein includes reducing resource consumption by implementing a single socket between a medical image scanner and a hypertext transport protocol (HTTP) enterprise tunnel (HET) server. The aspects of the system and method eliminate the need for a tunnel for each of a plurality of services. An aspect of the subject matter described herein is a system that comprises a processor; and a storage device coupled to the processor. The storage device comprises executable instructions capable of directing the processor to control: an applications layer, a tunnel layer, a transport layer, and a network layer. The tunnel layer includes a multiplexing tunnel (MT) and a HET that is operably coupled to the MT. The HET is based on a universal secure socket layer wrapper that secures a client server communication, and wherein the HET tunnels a single transmission control protocol Internet protocol (TCP/IP) port over a public network without opening any incoming ports. Another aspect of the subject matter described herein is a method to provide secure communications between a plurality of computers over a public network, the method comprising the steps of establishing a connection over the public network between the plurality of computers by mimicking HTTP enterprise tunnel protocol; changing the connection to a multiplexing protocol; and multiplexing communication on the connection over a single TCP/IP port.

Another aspect of the subject matter described herein is a system to provide secure communications. The system comprises a component compliant with HET protocol; and an agent that couples to the HET component and establishes a connection over a public network between a plurality of computers by mimicking the HET protocol and that switches the connection to a multiplexing protocol, where the system provides tunneling a single TCP/IP port over a public network without opening any incoming ports.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific aspects which can be practiced. These aspects are described in sufficient detail to enable those skilled in the art to practice the aspects, and it is to be understood that other aspects can be utilized and that logical, mechanical, electrical and other changes can be made without departing from the scope of the aspects. The following detailed description is, therefore, not to be taken in a limiting sense.

The detailed description is divided into five sections. In the first section, a system level overview is described. In the second section, aspects of methods are described. In the third section, a hardware and the operating environment in conjunction with which aspects can be practiced are described. In the fourth section, particular implementations are described. Finally, in the fifth section, a conclusion of the detailed description is provided.

Figure 1:
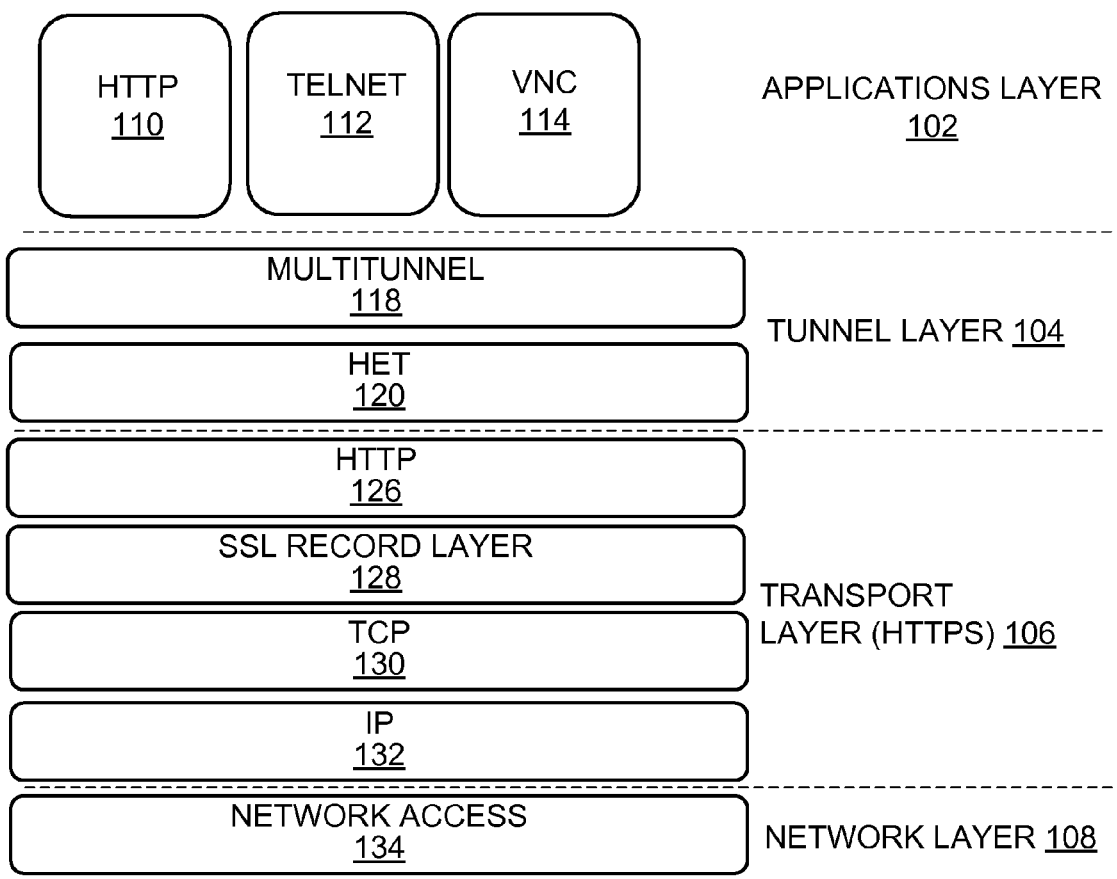
FIG. 1 illustrates communication layers used by a multiplexing tunnel

FIG. 1 illustrates communication layers used by a multiplexing tunnel. FIG. 1 is a block diagram of a communication model 100 that provides secure networking over a public network by multiplexing all communication over a single transmission control protocol Internet protocol (TCP/IP) port. Communication model 100 provides a single multiplexing tunnel that serves multiple applications, thus reducing resource consumption. In communication model 100, an application does not have to wait for a tunnel to be ready. Communication model 100 also supports backward tunneling.

Some implementations of communication model 100 include four different layers, an applications layer 102, a tunnel layer 104, a transport layer 106, and a network layer 108.

Some implementations the applications layer 102 include a hypertext transfer protocol (HTTP) communications component 110, a telnet-compliant tool 112 and/or a virtual network computing (VNC) viewer 114. The VNC viewer 114 is a graphical desktop sharing system which uses the remote frame buffer (RFB) protocol to remotely control another computer. The VNC viewer 114 transmits keyboard and mouse events, relaying graphical screen updates back in the other direction, over a network.

Some implementations of the tunnel layer 104 include a multiplexing tunnel (MT) component 118 and a hypertext transport protocol (HTTP) enterprise tunnel (HET) component 120 that is operably coupled to the MT component 118. The HET component 120 is operable to tunnel a single TCP/IP port over a public network without opening any incoming ports. Some implementations of the HET component 120 are provided by Questra Corp., 3200 Bridge Parkway, Suite 101, Redwood City, Calif. 94065. The HET component 120 is based on Stunnel, which is a universal secure socket layer (SSL) wrapper that is used to secure a client server communication. However, Stunnel requires opening a port per application in which each port can tunnel a single application. Stunnel is published by Mobi-Com Polska Sp. of z o.o., ul. Bogatynska 3 m. 42, Warszawa, 01-461, Poland. The tunnel layer 104 can tunnel HTTP, Telnet and/or VNC protocols.

The transport layer 106 includes a hypertext transfer protocol (HTPP) 126 layer and a secure socket layer (SSL) 128. Thus, the HET component 120 is based on Stunnel. The transfer layer 106 also includes a transmission control protocol (TCP) layer 130 and an Internet protocol (IP) layer 132. The network layer 108 includes a network access layer 134.

The multiplexing tunnel (MT) component 118 of communication model 100 provides application level tunneling over the Internet without the need of complex reconfiguring of other virtual private network (VPN) standards such as Internet protocol security (IPSEC) and OpenVPN. IPSEC is defined in a number request-for-comment published by the Internet Engineering Task Force (IETF) at c/o Association Management Solutions, LLC (AMS) 48377 Fremont Blvd., Suite 117, Fremont, Calif. 94538. OpenVPN is published by OpenVPN, Inc. of 4625 First Street, Suite 210, Pleasanton, Calif. 94566. The MT component 118 of communication model 100 supports clients running on a private local area network (LAN) to connect to services running on a remote LAN, and vise versa connect remote clients to local services in situations where direct connection to the service port is not allowed, or not feasible due to Network Address Translation (NAT). The MT component 118 supports connections up to 65534 sockets between the two networks. MT component 118 also reduces the time required to establish a tunnel when using multiple applications. In addition, by using as the transport layer standard HTTPs protocol (106) the MT component 118 of also does not require a firewall rule on a receiving computer to receive communication. Furthermore, the MT component 118 supports tunnel applications whose public end points use dynamic IP addresses, such as dynamic host configuration protocol (DHCP) clients. DHCP is used by networked devices (clients) to obtain or receive various parameters necessary for the clients to operate in an IP network.

Furthermore, the MT component 118 of communication model 100 is operable to create a secure transport security layer (TLS) or a secure sockets layer (SSL) tunnel over public networks. The TLS/SSL are cryptographic protocols that provide secure communications on the Internet for such things as web browsing, e-mail, Internet faxing, instant messaging and other data transfers. A TLS/SSL client and server negotiate session parameters by using a handshaking procedure. During this handshake, the client and server agree on various parameters used to establish the connection's security. The handshake begins when a client connects to a TLS/SSL-enabled server requesting a secure connection, and presents a list of supported ciphers and hash functions. From this list, the server picks the strongest cipher and hash function that it also supports and notifies the client of the decision. The server sends back its identification in the form of a digital certificate. The certificate usually contains the server name, the trusted certificate authority (CA), and the server's public encryption key. The client can contact the server that issued the certificate (the trusted CA as above) and confirm that the certificate is authentic before proceeding. In order to generate the session keys used for the secure connection, the client encrypts a random number with the server's public key, and sends the result to the server. Only the server can decrypt it (with its private key): this is the one fact that makes the keys hidden from third parties, since only the server and the client have access to this data. From the random number, both parties generate key material for encryption and decryption. This concludes the handshake and begins the secured connection, which is encrypted and decrypted with the key material until the connection closes. If any one of the above steps fails, the TLS/SSL handshake fails, and the connection is not created.

In yet other implementations, the MT component 118 of communication model 100 saves remote user time while attempting to connect to multiple applications in a single remote service session, the multiplexing tunneling of communication model 100 provides faster remote browsing and instant port connections between the remote and local end points and the multiplexing tunneling reduces the bandwidth required to service remote devices. Multitunnel 118 eliminates the need for a virtual private network (VPN) Internet protocol security (IPSEC) and a secure shell (SSH) in the tunnel layer 104 and the transport layer 106. Communication model 100 does not includes a VPN IPSEC or a SSH. VPN IPSECs include a suite of protocols for securing IP communications by authenticating and/or encrypting each IP packet in a data stream and tunnel layer 104 and the transport layer 106. A SSH provides encryption to transmitted data.

Figure 15:
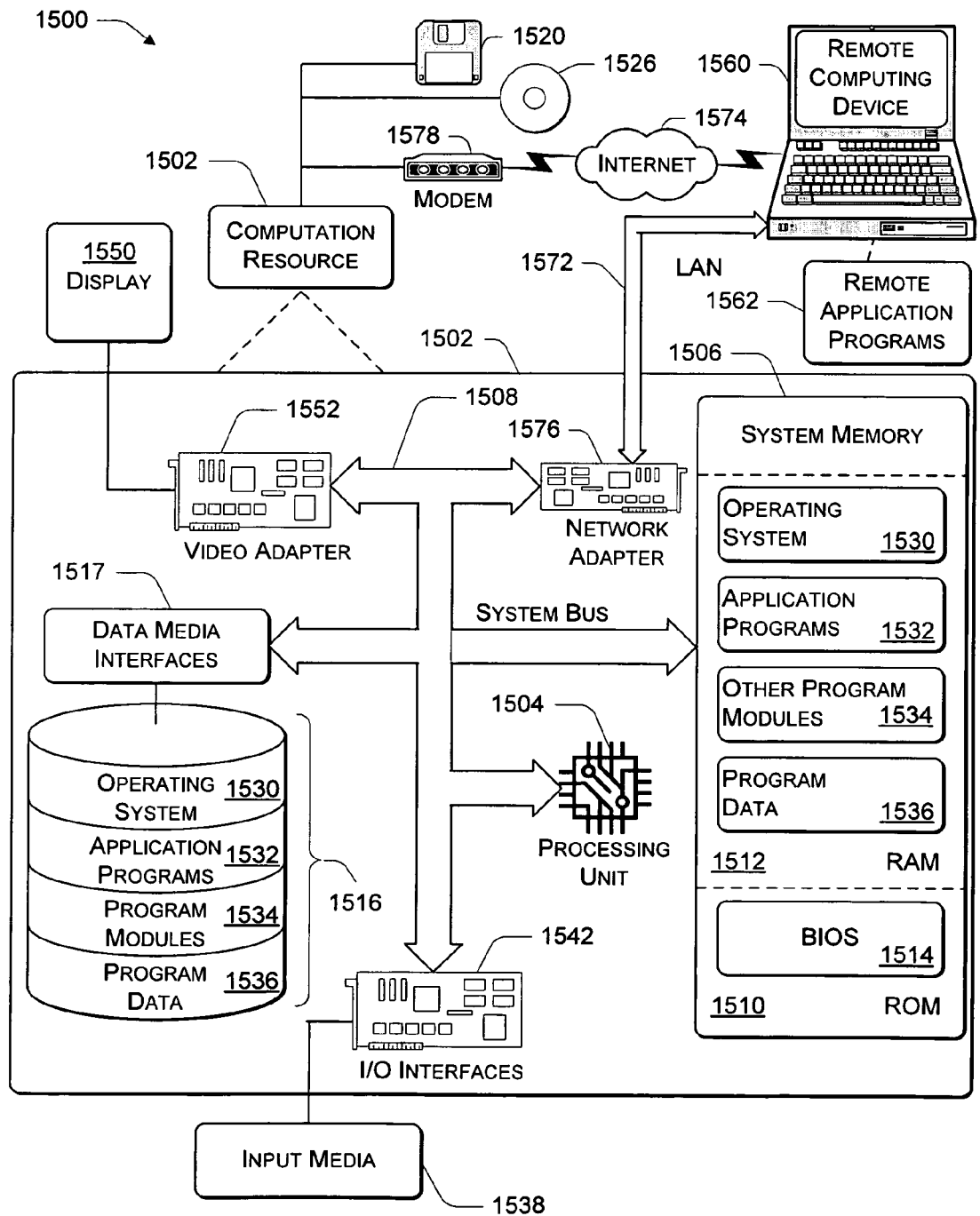
FIG. 15 illustrates an example of a general computation resource useful in the context of the environment of FIG. 14.

Some implementations of the communication model 100 can operate in a multi-processing, multi-threaded operating environment on a computer, such as computer 1500 in FIG. 15.

Having provided the above-description of the communication model 100, the following is a description of aspects of method 200 to provide secure communications between a plurality of computers over a public network. Aspects of method 200 are described with reference to a flowchart to enable one skilled in the art to develop such programs, firmware, or hardware, including such instructions to carry out the methods on suitable computers, executing the instructions from computer-readable media. The sequence of the acts or steps of the following method 200 can vary. The method 200 may not require each act or step in the foregoing description, or may include additional acts or steps not disclosed herein. An aspect of the steps or acts of the aspects of the method 200 in the foregoing description can be represented as programming instructions for execution by firmware or hardware that is a part of, a computer, such as computer 1500 in FIG. 15.

Figure 2:
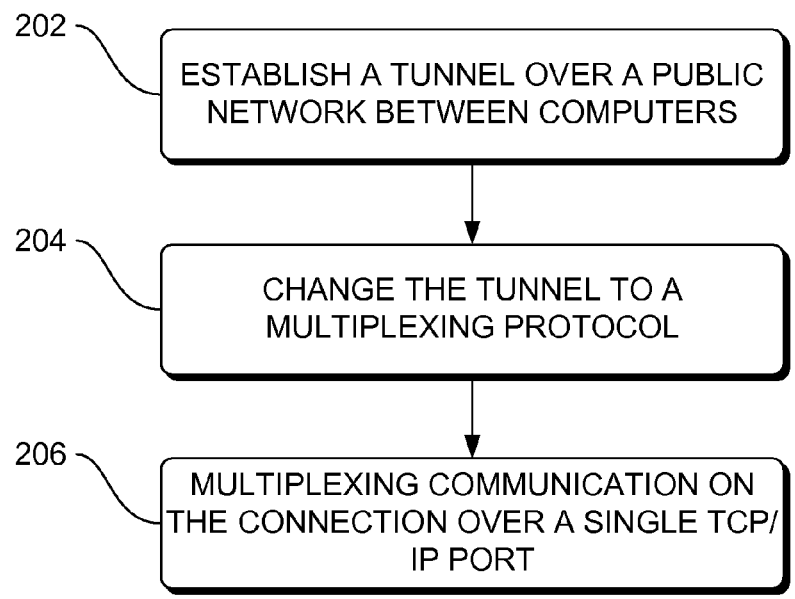
FIG. 2 is a flowchart of an aspect of a method to provide secure multiplexed communications between a plurality of computers over a public network.

FIG. 2 is a flowchart of an aspect of the method 200 to provide secure multiplexed communications between a plurality of computers over a public network. Multiplex tunneling (MT) of method 200 provides secure networking over a public network by multiplexing all communication over a single transmission control protocol Internet protocol (TCP/IP) port.

Method 200 includes establishing a tunnel connection over the public network between the plurality of computers by using HET protocol, at block 202.

After a tunnel is established, method 200 includes changing (e.g. switching) the connection to a multiplexing protocol, at block 204 and multiplexing communication on the connection over a single TCP/IP port, at block 206. Thus, method 200 multiplexes several TCP/IP streams over a single TCP/IP port. Some aspects of establishing the tunnel connection include sending a first buffer as a handshake authentication, in which the buffer includes signature and version information. One example of a handshake is "MT:<1 bytes message size> followed by textual header of key value pairs with ':' and '=' as delimiters. Keys can be "ver" for version, "idleTO" for idle timeout, "keepAlive" for keep alive message frequency.

In one implementation, each packet of the multiplexing protocol includes 2 bytes for channel number, 2 bytes buffer size and data. An implementation of each local socket includes a channel number and each side of the connection maintains a mapping between the channel number to a matching local socket. An implementation of one of the channels is a control channel.

In one example of a protocol, channel 0 is a control channel, channel 1 is Telnet channel and channel 2 is a virtual network computing (VNC) channel.

The data available on a local socket can be read by a first computer of the plurality of computers and the data can be transmitted with a header to a second computer of the plurality of computers, the header including the channel number and the buffer size and the transmitted data can be decoded by the second computer and the decoded data can be written by the second computer to the appropriate "remote" socket according to the channel number.

The multiplexing tunnel (MT) of method 200 provides application level tunneling over the Internet without the need of complex reconfiguring of other VPN standards such as IPSEC or OpenVPN. The MT of method 200 supports clients running on a private local area network (LAN) to connect to services running on a remote LAN, in situations where direct connection to the service port is not allowed, or not feasible due to NAT. The multiplexing tunnel MT of method 200 supports connections up to 65534 sockets between the two networks. MT also reduces the time required to establish a tunnel when using multiple applications.

An aspect of the method 200 can be implemented as a computer data signal embodied in a carrier wave, that represents a sequence of instructions which, when executed by a processor, such as processor 1504 in FIG. 15, cause the processor to perform the respective method. In other aspects, method is implemented as a computer-accessible medium having executable instructions capable of directing a processor, such as processor 1504 in FIG. 15, to perform the respective method. In varying aspects, the medium is a magnetic medium, an electronic medium, or an optical medium.

Figure 3:
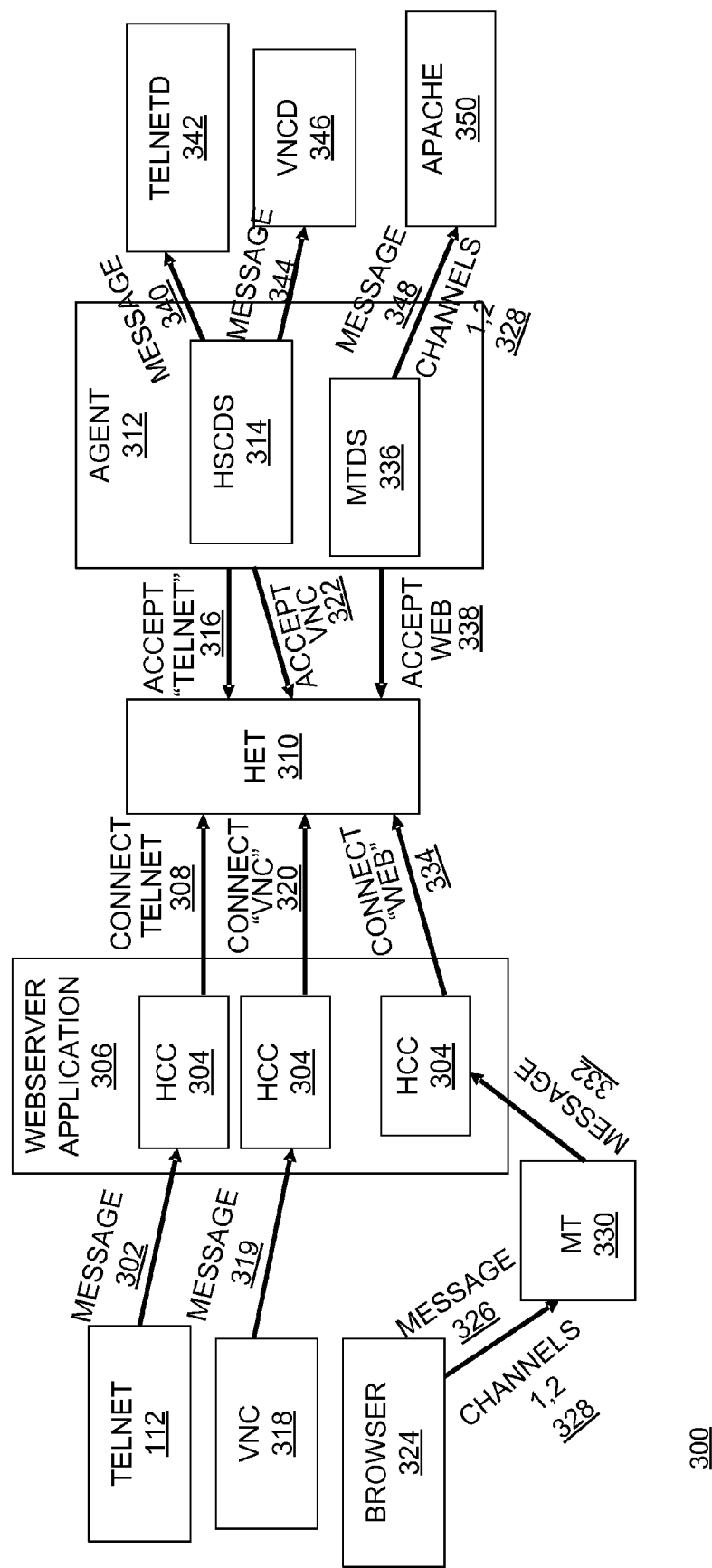
FIG. 3 is a block diagram of a snapshot in time of a multi-tunneling system.

FIG. 3 is a block diagram of a snapshot in time of a multi-tunneling system 300. In system 300, arrows show a TCP/IP connection direction, and HET protocol commands. System 300 multiplexes data involving a HTTP enterprise tunnel. In system 300, a Telnet-compliant tool 112 is operable to transmit messages 302 to an instantiation of an HTTP (securelink) client connection (tunnel) (HCC) 304 in a webserver application 306. One example of the webserver application 306 is a Questra Smart Service (QSS). QSS is a device management facility that helps determine the optimal maintenance schedule for devices, provides information that allows field service applications to create efficient service schedules, monitors for quality control, calibration, metering and other data to detect problems before the problems occur and fix the problems remotely, provides timely advance notice to customers of a service call, resets instruments or run device diagnostics, uses remote access to make "virtual service calls" to resolve problems without going on-site, generates data on equipment usage and performance that can be used to automate consumables sales and ordering, preserves data security and communicates securely with intelligent devices behind hospital or laboratory firewalls, without breaching any safeguards or requiring IT changes, complies with HIPAA and does not obtain patient information, receives and responds to alerts generated directly by medical devices, and/or without customer intervention.

The HCC 304 transmits a "connect Telnet" 308 message to a HTTP enterprise tunnel (HET) 310. An agent 312 having an agent extension (data source) HSCDS 314 provides HSC functionality, HSC being HTTP (securelink) Server Connection (tunnel). Some implementations of the HSCDS 314 are provided by QUESTRA® Corp. The HSCDS 314 sends a "accept telnet" message 316 to the HET 310.

In system 300, a virtual network computing (VNC) viewer 318 transmits messages 319 to an instantiation of an HCC 304 in the webserver application 306. The HCC 304 also transmits a "connect VNC" 320 message to the HET 310. The HSCDS 314 transmits a "accept VNC" message 322 to the HET 210.

In system 300, a browser 324 transmits messages 326 to a multiplexing tunnel (MT) 330, over channels one and two 328. One example of the browser 324 is Microsoft Internet Explorer (IE). The MT 330 transmits messages 332 to an instantiation of the HCC 304 in the webserver application 306. In some aspects, the MT 330 is a component within the webserver application 306. In system 300, the MT 330 will be provided as a data-source agent extension. System 300 can implement a separate agent command executed upon user demand that will not affect network utilization. The HCC 304 transmits a "connect web" 334 message to the HET 310.

The agent 312 can also include a multiplexing tunnel data source (MTDS) 336 that communicates with the HET server 310 using the HET protocol. The MTDS 336 sends a "accept web" message 338 to the HET 310.

In some implementations, the HSCDS 314 sends messages 340 to a telnet daemon (Telnetd) 342. In some implementations, the HSCDS 314 send messages 344 to a VNCD 346. The MTDS 336 sends messages 348 to an Apache web server 350 over channels one and two 328

Figure 4:
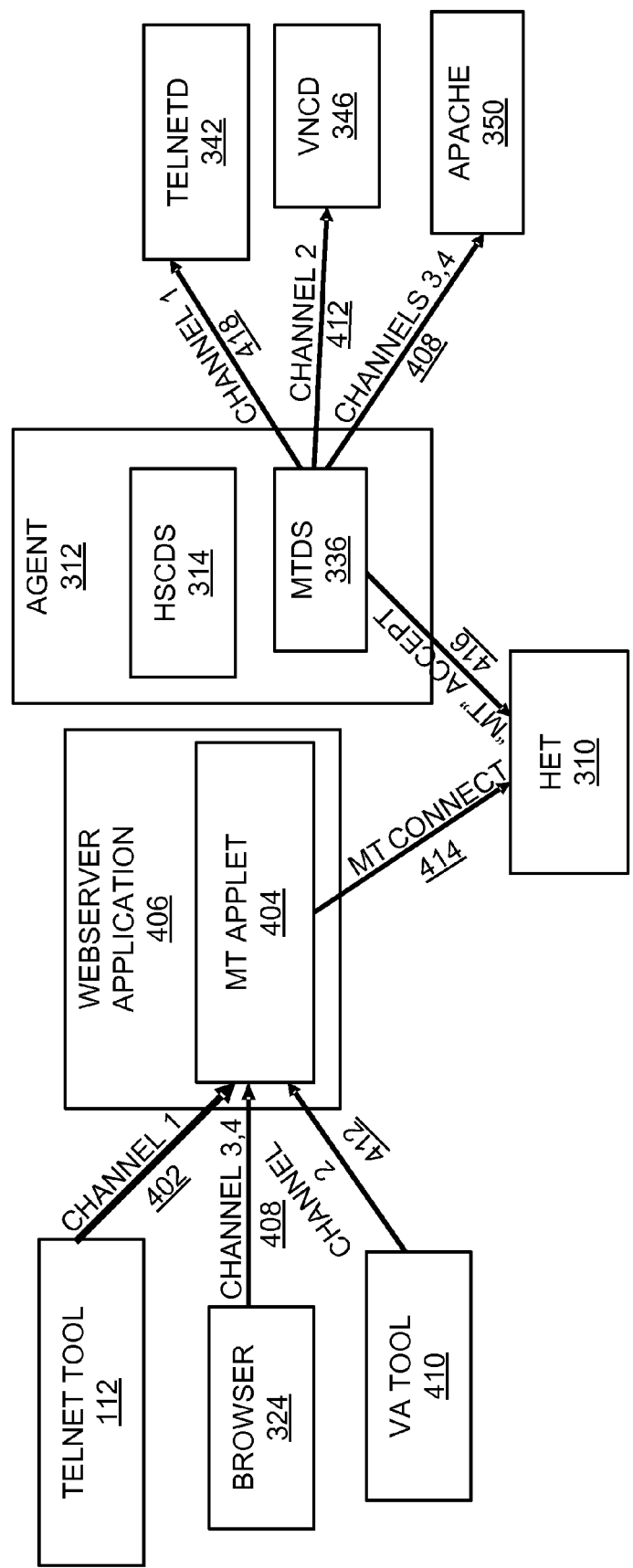
FIG. 4 is a block diagram of a snapshot in time of a multi-tunneling system.

FIG. 4 is a snapshot in time of a multitunneling system 400. In FIG. 4, arrows show a TCP/IP connection direction and HET protocol commands. In system 400, the Telnet tool 112 transmits messages through channel one 402 to a multiplexing tunnel (MT) applet 404 in a webserver application 406. In system 400, the browser 324 transmits messages across channels three and four 408 to an MT applet 404 in the webserver application 406. In system 400, a VA tool 410 transmits messages across channel two 412 to the MT applet 404 in the webserver application 406.

The MT applet 404 in the webserver application 406 transmits "MT connect" 414 messages to the HET 310. The HET 310 connects socket 414 with socket "MT accept" 416 connected from MTDS 336 to establish a tunnel.

The MTDS 336 transmits messages across channel one 418 to the telnet daemon (Telnetd) 342. The MTDS 336 transmits messages across channel two 412 to the VNCD 346. The MTDS 336 transmits messages across channels three and four 408 to the Apache web server 350.

Referring to FIGS. 5-13, particular implementations are described in conjunction with the communication model 100 in FIG. 1 and the method 200 described in conjunction with FIG. 2. The FIGS. 5-13 use the Unified Modeling Language (UML), which is the industry-standard language to specify, visualize, construct, and document the object-oriented artifacts of software systems. In FIGS. 5-13, a hollow arrow between classes is used to indicate that a child class below a parent class inherits attributes and methods from the parent class. A class is a prototype of an object that defines data and methods. An object is an instantiation of a class. In addition, a conventional arrow is used to indicate that an object of the class that is depicted above an object of another class is composed of the lower depicted object. Composition defines the attributes of an instance of a class as containing an instance of one or more existing instances of other classes in which the composing object does not inherit from the object(s) of which it is composed.

Figure 5:
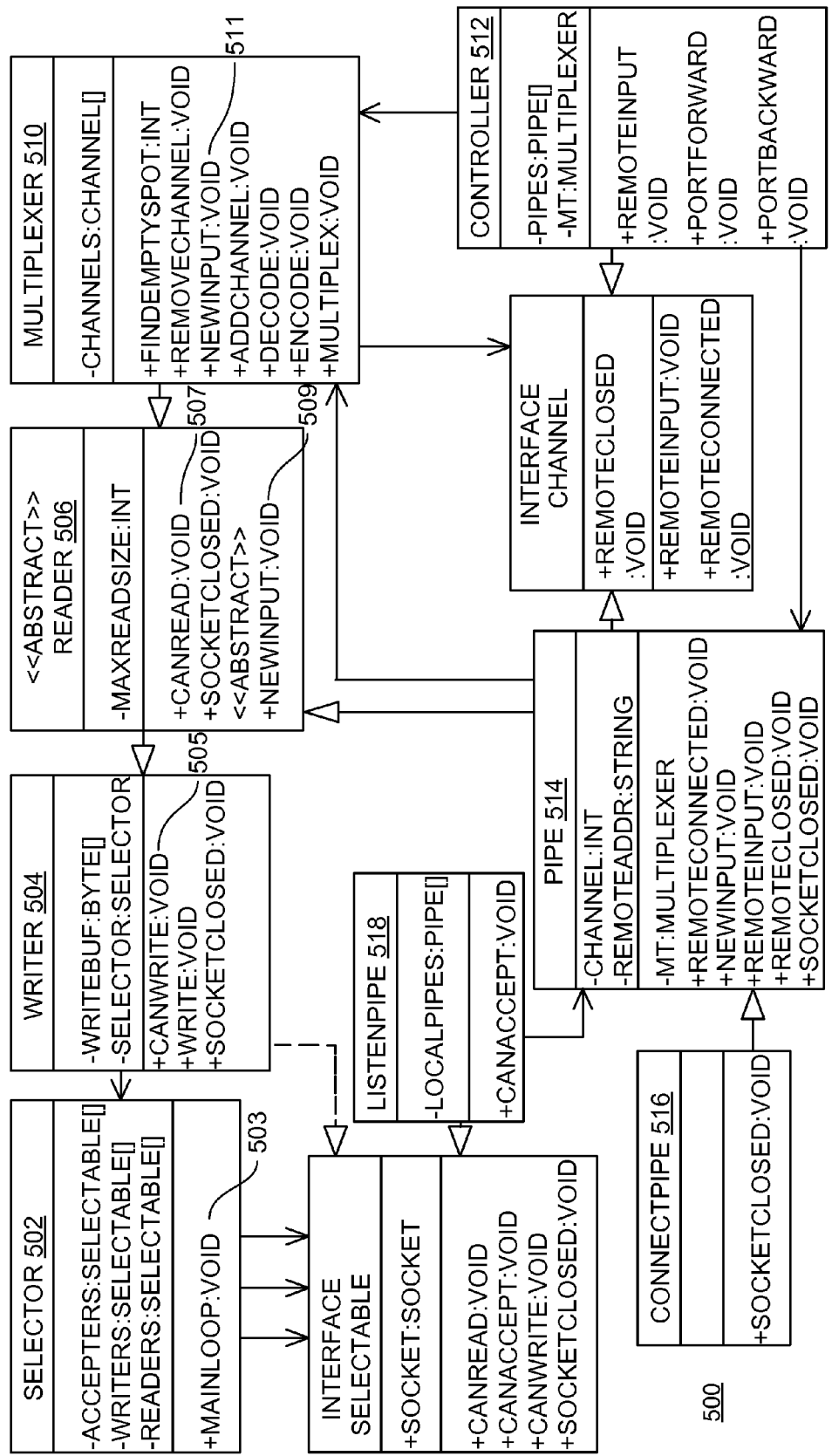
FIG. 5 is a block diagram of an aspect of a class hierarchy operable to multiplex data.

FIG. 5 is block diagram of an aspect of a class hierarchy module 500 operable to multiplex data. Basic I/O classes in module 500 include a selector class 502 that embodies a main select loop 503 to register a selectable, a Writer 504 that is operable to asynchronously write data to a socket using a canWrite function 505, and a reader 506 that at construction is operable to register itself for reading through a canRead function 507. The canRead function 507 is operable to read up to a predefined limit of data into a buffer and calls a newInput function 509 to process the data buffer.

An aspect of a multiplexing class in the class hierarchy module 500 includes a multiplexer class 510. An object of the multiplexer class 510 is operable to multiplex several channels into a single socket. A newInput function 511 accumulates data until an object of the multiplexor class 510 has a full message and then the object of the multiplexor class 510 sends the data to the appropriate channel for parsing (remoteInput). A multiplexing method such as method 200, can encode data from a channel and write the data to the remote socket. One child class of the multiplexor classes 510 in class hierarchy module 500 includes a controller class 512 that in some implementations uses channel number 0. When a remote input data is received, the remote input data is parsed and an appropriate command (e.g. "local forward", "remote closed", "remote connected", "remote forward" and "ping") is executed. The multiplexer class 510 manages the life cycle of all the other channels. In some situations, the multiplexer class 510 is merged with the controller 512 class.

An aspect of a channel class in the class hierarchy module 500 can include a pipe class 514. An object of the pipeclass 514 is operable to transfer data and closes event from a local socket to an object of the multiplexer class 510. Another aspect of the channel class in class hierarchy module 500 can include a connectpipe class 516. An object of the connectpipe class 516 is operable to connect to local service of behave of remote client. Yet another aspect of the channel class in class hierarchy module 500 includes a listenPipe class 518. An object of the listenpipe class 518 is operable to listen on local socket on behalf of a remote service center. An object instantiated from the pipe class 514 can be instantiated for each locally accepted client.

Figure 6:
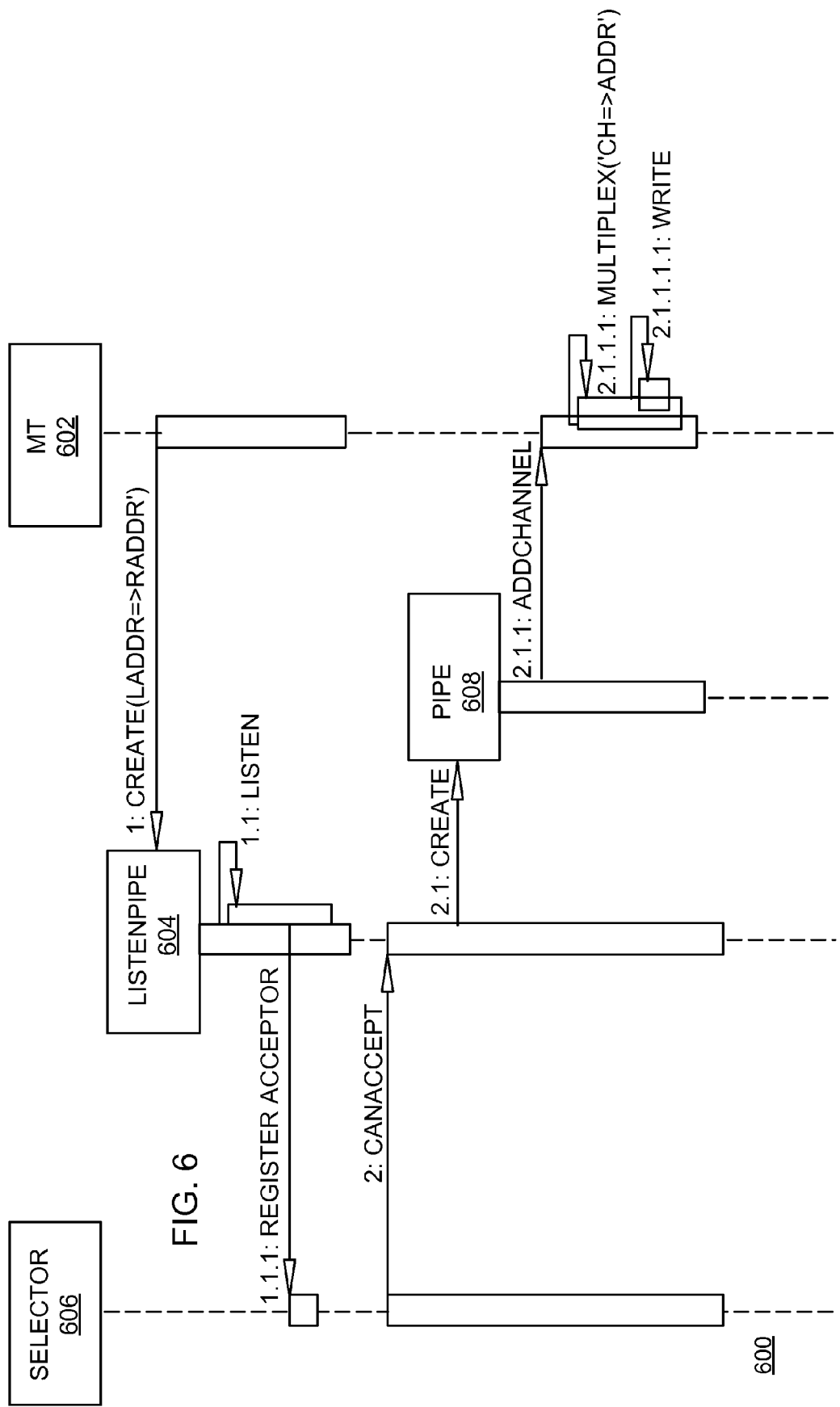
FIG. 6 includes two use case diagrams, the upper use case showing a use case of listening for local clients, and the lower use case showing a use case of new clients connecting to local MT and requesting the remote MT.

FIG. 6 includes two use case diagrams, the upper use case showing a use case of listening for local clients, and the lower use case showing a use case of new clients connecting to local MT and requesting the remote MT. The upper use case of listening for local clients is a use case 600 that multiplexes data. In use case 600, an MT object 602 sends a message to "create" to a listenpipe object 604 and thereafter the listenpipe object 604 sends a recursive message to "listen" to itself. The MT object 602 is an instantiation of the multiplexer class 510 in FIG. 5. The listenpipe object 604 is an instantiation of the listenpipe class 518 in FIG. 5.

Thereafter, the listenpipe object 604 sends a message to "register acceptor" to the selector object 606. The listenpipe object 604 is an instantiation of the listenpipe class 518 in FIG. 5 that is operable to listen for new connection and creates a new pipe for each new connection.

In the lower use case of new clients connecting to local MT and requesting the remote MT, the selector object 606 sends a message indicating "canacept" to the listenpipe object 604 and the listenpipe object 604 sends a message to "create" to a pipe object 608 and the pipe object 608 sends a message to "add a channel" to the MT object 602. The pipe object 608 is an instantiation of the pipe class 514 in FIG. 5. Thereafter, the MT object 602 sends a recursive message to "multiplex" to itself and thereafter sends a recursive message to "write" to itself.

Figure 7:
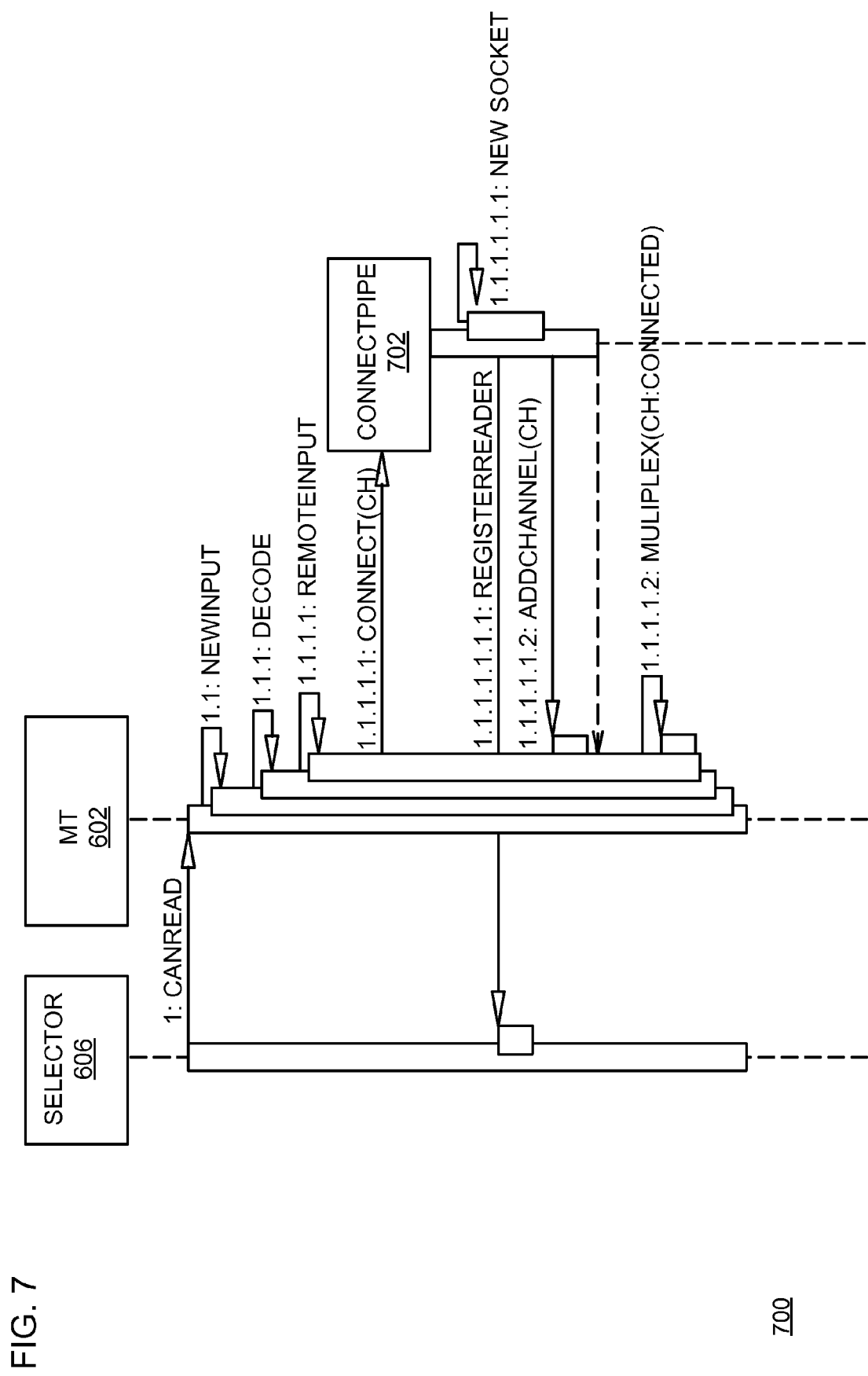
FIG. 7 is a use case diagram of a multiplexing tunnel reacting to a request to connect to a service.

FIG. 7 is a use case diagram 700 of a multiplexing tunnel reacting to a request to connect to a service. In use case 700, a selector object 606 sends a message indicating "can read" to a MT object 602. Thereafter, the MT object 602 sends a recursive message indicating "newinput" to itself and a recursive message to "decode" to itself and a recursive message indicating "remote input" to itself and then sends a message to "connect" to a connectpipe object 702. Then the connectpipe object 702 connects a pipe to a local network address, more specifically sends a recursive message indicating "newsocket" to itself and then the connectpipe object 702 sentence a message to "register a reader" to the selector object 606 and the connectpipe object 702 sends a message to "add a channel" to the MT object 602, and to the MT object 602 sends a recursive message to "multiplex" to itself.

Figure 8:
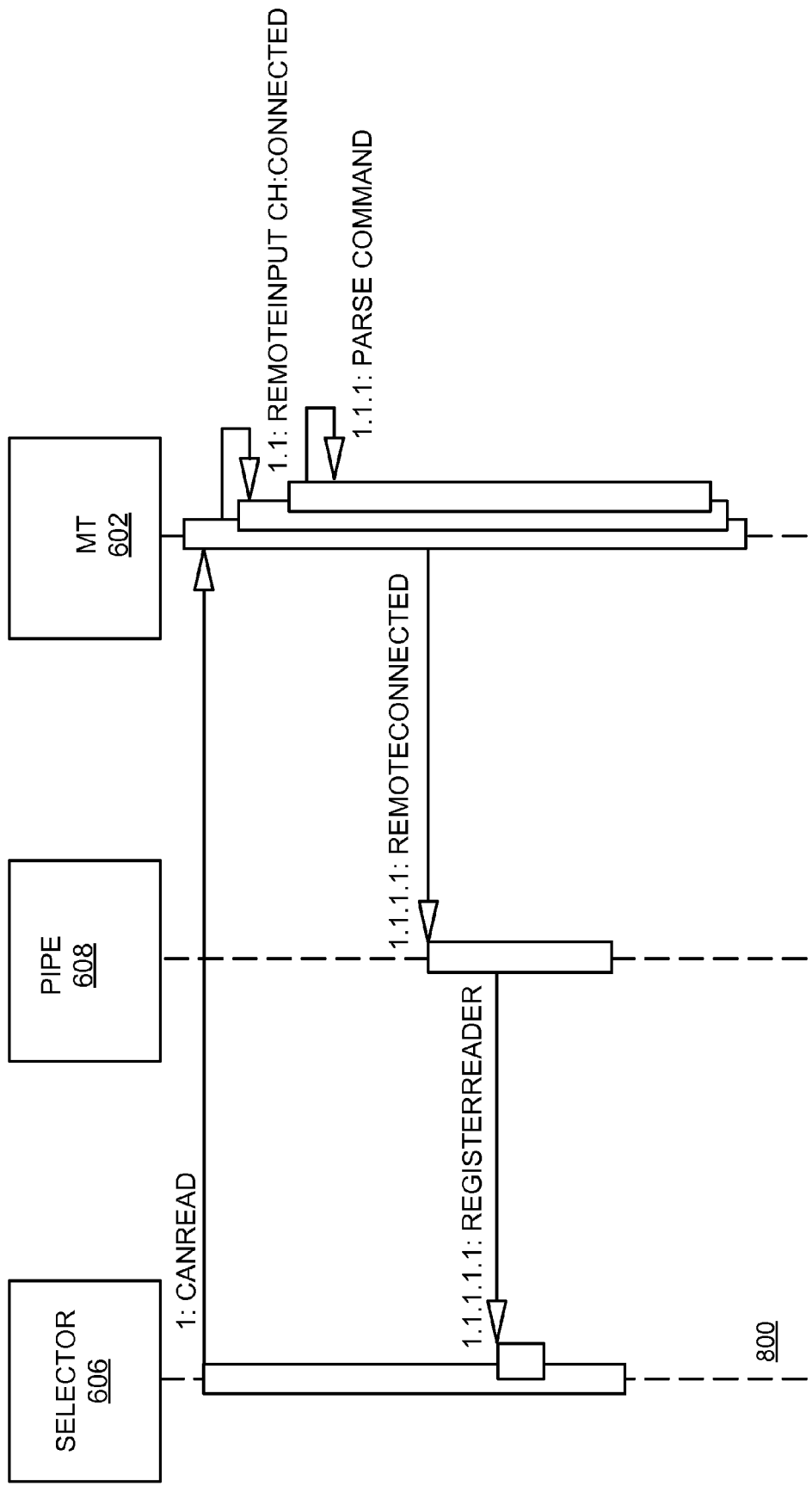
FIG. 8 is a use case diagram of a multiplexing tunnel reacting to a confirmation that a channel was connected remotely, and setting the channel for reading.

FIG. 8 is a use case diagram 800 of a multiplexing tunnel reacting to a confirmation that a channel was connected remotely, and setting the channel for reading. In use case 800, a selector object 606 sends a message that indicates "can read" to a MT object 602. Thereafter, the MT object 602 sends a recursive message indicating "remote input" to itself and then a recursive message to "parse" to itself and the MT object 602 sends a message indicating "remote connected" to a pipe object 608, and the pipe object 608 sends a message to "register reader" to the selector object 606.

Figure 9:
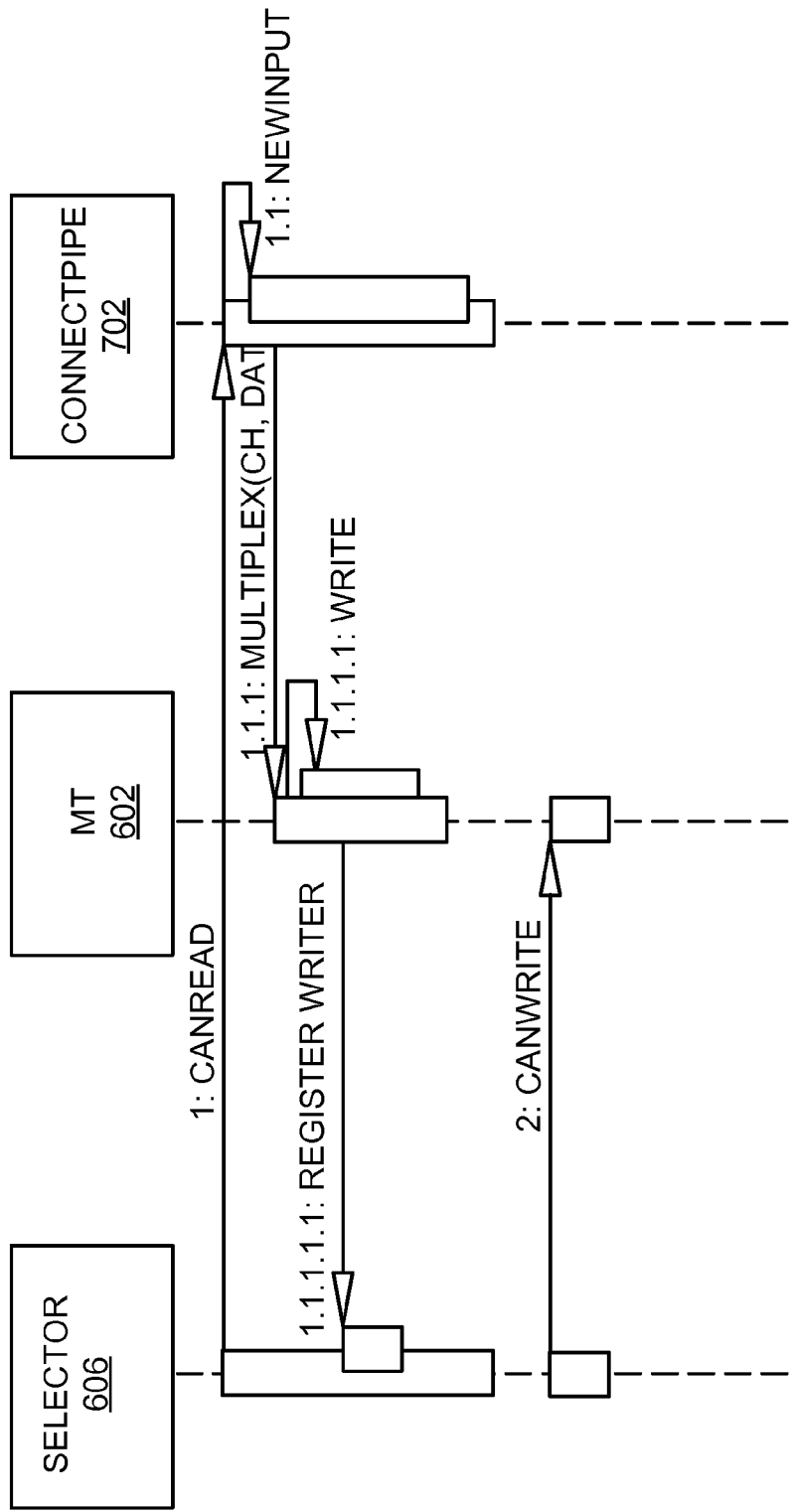
FIG. 9 is a use case diagram of reading data from a local multiplexing tunnel and tunneling the data to a remote multiplexing tunnel.

FIG. 9 is a use case diagram 900 of reading data from a local multiplexing tunnel_and tunneling the data to a remote multiplexing tunnel. In use case 900, the selector object 606 sends a message indicating "can read" to a connectpipe object 702 and the connectpipe object of 702 sends a recursive message indicating "new input" to itself and a message to "multiplex" to a MT object 602. Thereafter, the MT object 602 sends a recursive message to "write" to itself and then sends a message to "register writer" to the selector object 606 and the selector object 606 sends a message indicating "can write" to the MT object 602.

Figure 10:
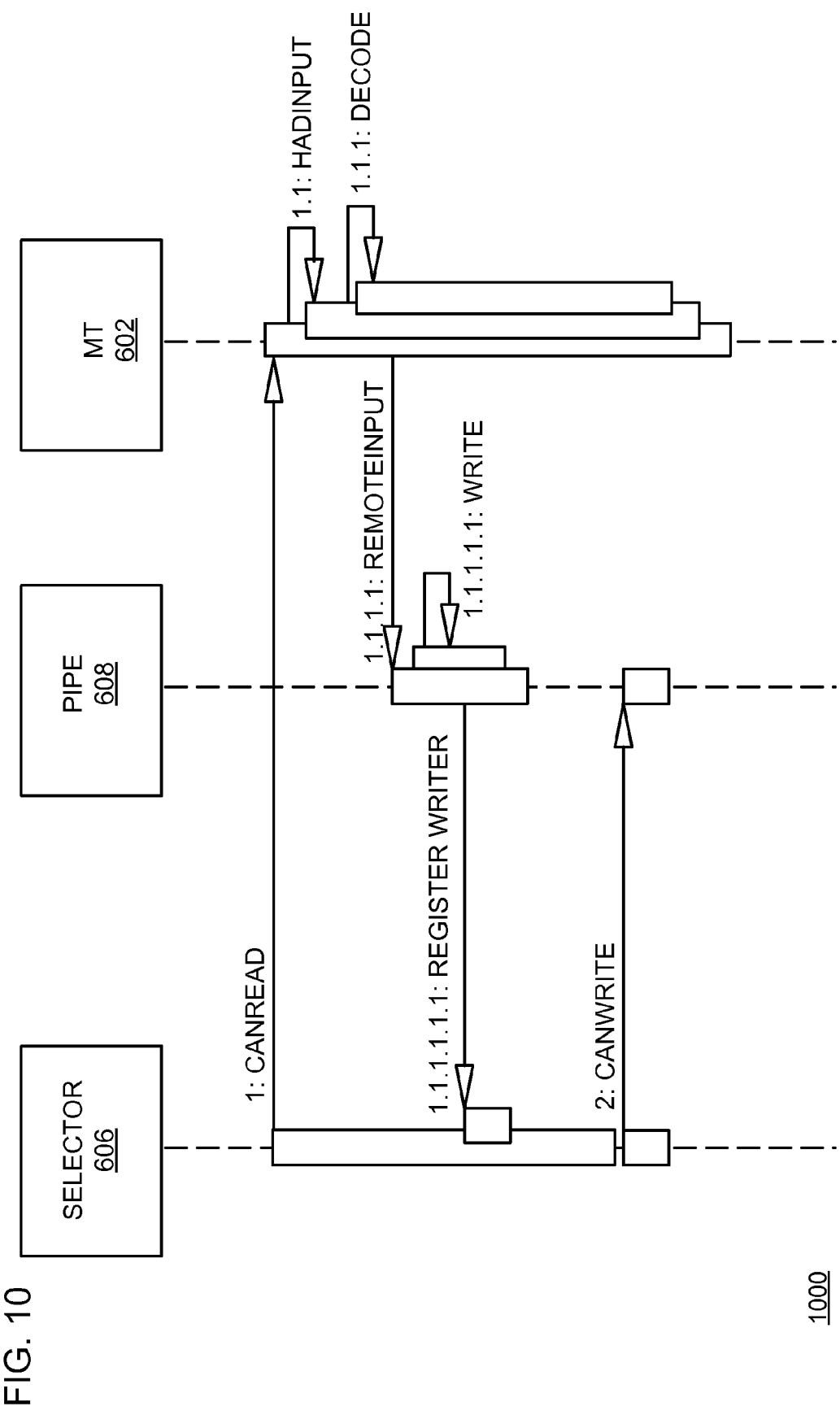
FIG. 10 is a use case diagram of reading data from a remote MT and writing the data into a local socket.

FIG. 10 is a use case diagram 1000 of reading data from a remote MT and writing the data into a local socket. In use case 1000, the selector object 606 sends a message indicating "can read" to a MT object 602, which in turn sends a recursive message indicating "had input" to itself and a recursive message to "decode" to itself and thereafter sends a message indicating "remote input" to a pipe object 608. The pipe object 608. Then sends a recursive message to "write" to itself and a message to "register writer" to the selector object 606. Thereafter, the selector object 606 sends a message indicating "can write" to the pipe object 608.

Figure 11:
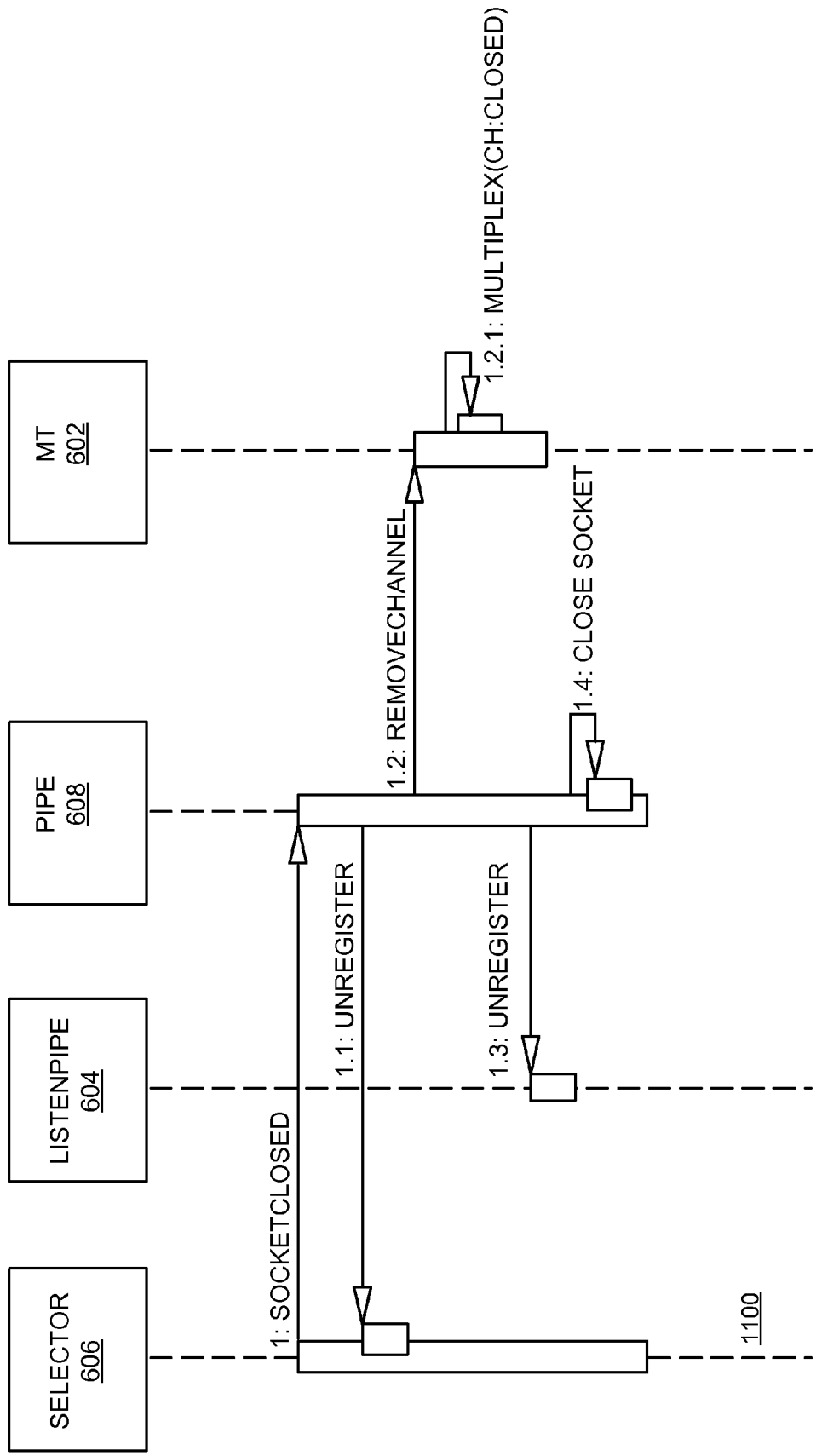
FIG. 11 is a use case diagram of a local socket close.

FIG. 11 is a use case diagram 1100 of a local socket close. In use case diagram 1100, the selector object 606 sends a message indicating "socket closed" to a pipe object 608, which in turn sends a message to "unregister" to the selector object 606. Thereafter, the pipe object 608 sends a message to "remove channel" to a MT object 602, which in turn sends a recursive message to "multiplex" to itself. The pipe object 608 thereafter also sends a message to "unregister" to a listenpipe object 604, and the pipe object 608 sends a recursive message to "close socket" to itself.

Figure 12:
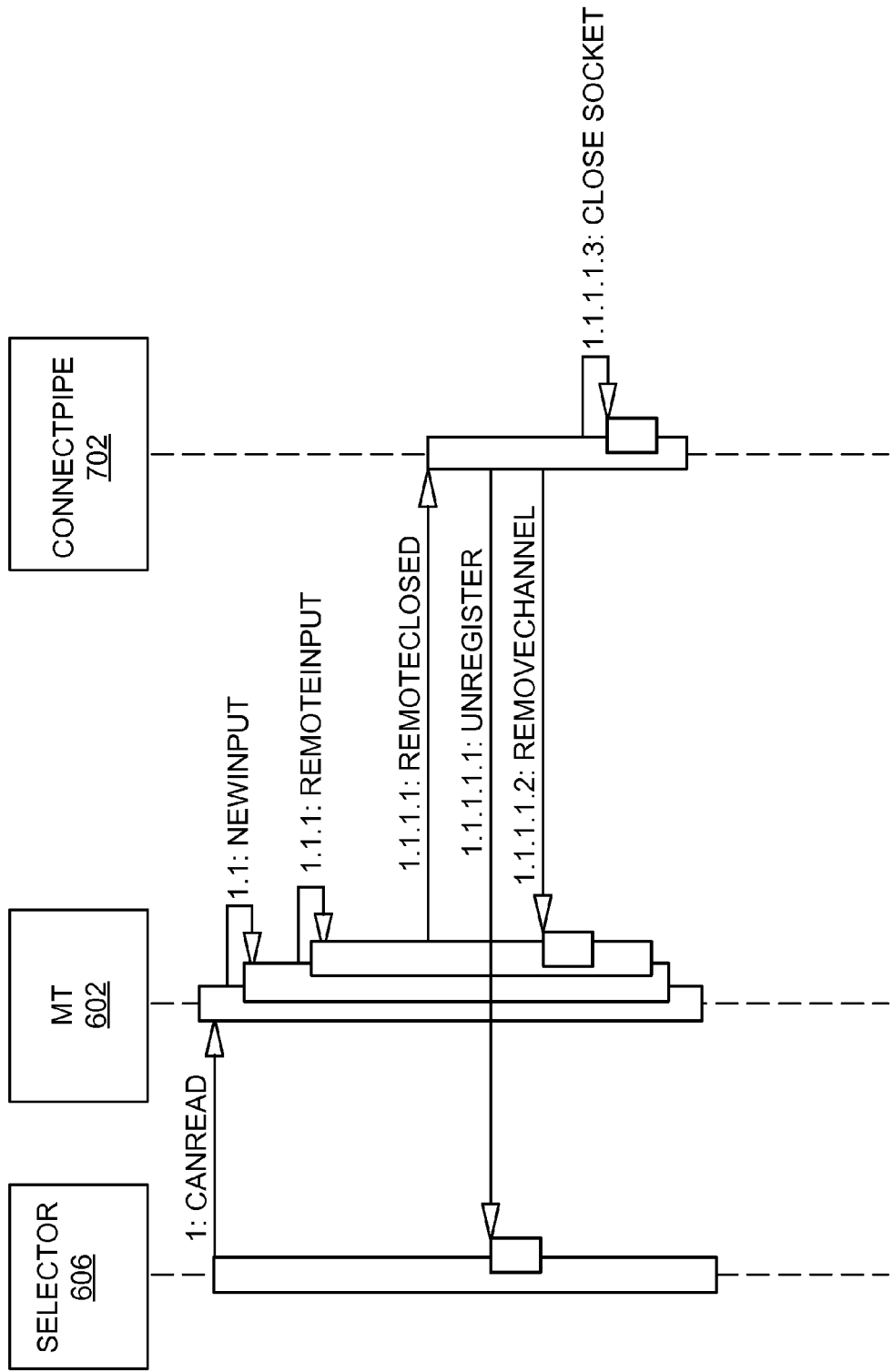
FIG. 12 is a use case diagram of a remote socket close.

FIG. 12 is a use case diagram 1200 of a remote socket close. In use case 1200, the selector object 606 sends a message indicating "can read" to a MT object 602, which in turn sends a recursive message indicating "new input" to itself and a recursive message indicating "remote input" to itself, and then a message indicating "remote closed" to a connectpipe object 702. Thereafter, the connectpipe object 702 sends a message to "unregister" to the selector object 606 and a message to "remove channel" to the MT object 602. Thereafter, the connectpipe object 702 for sends a recursive message to "close socket" to itself.

Figure 13:
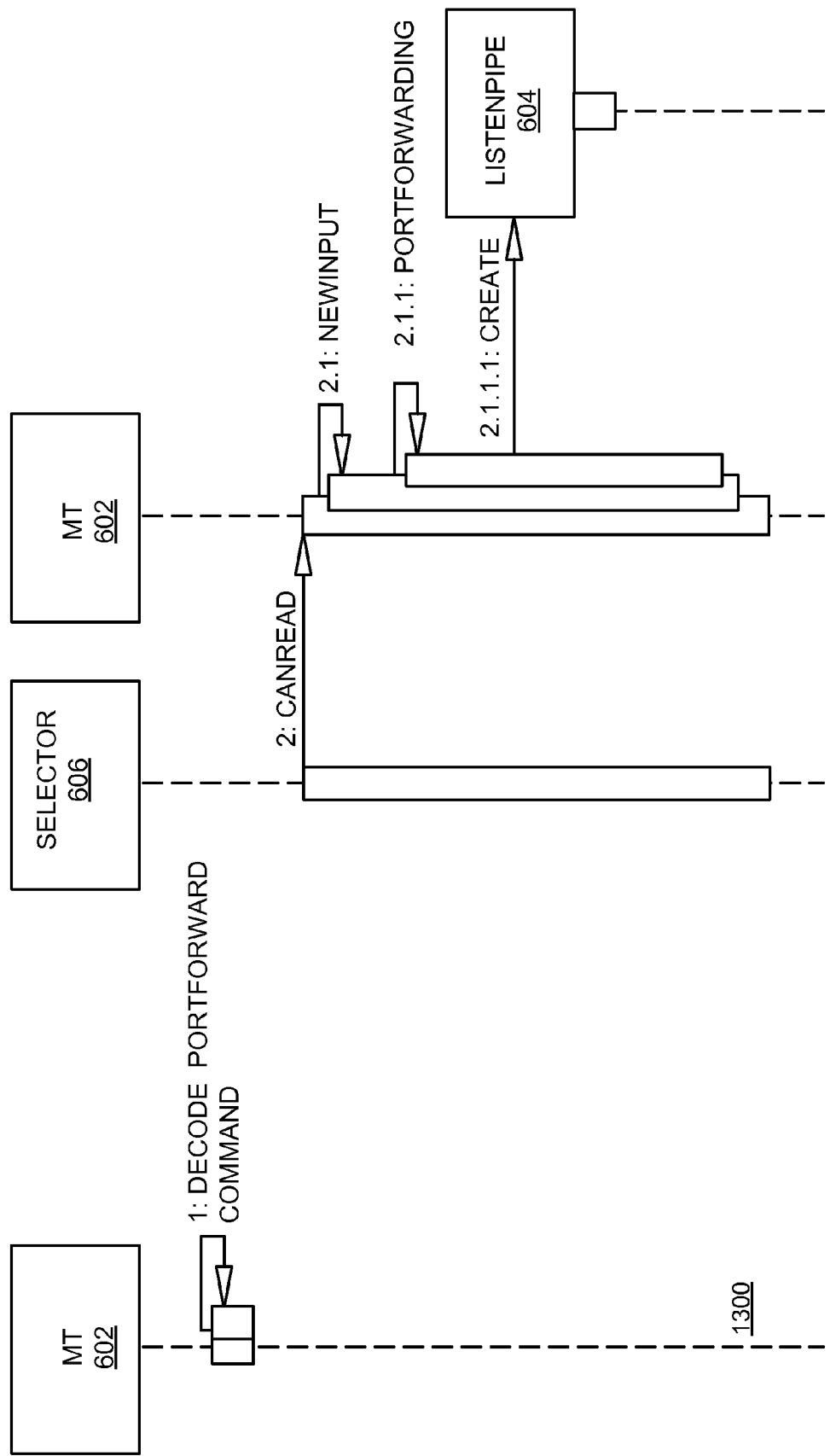
FIG. 13 is a use case diagram of a request another side to perform port-forwarding.

FIG. 13 is a use case diagram 1300 of a request another side to perform port-forwarding. In use case 1300, the MT object 602 sends a recursive message to decode a port forward command. Thereafter, a selector object 606 sends a message indicating "can read" to a MT object 602, and in turn, the MT object 602 sends a recursive message indicating "new input" to itself and a recursive message indicating "port forwarding" to itself and a sends message to "create" to a listenpipe object 604.

The aspects of class hierarchy 500 and use cases 600, 700, 800, 900, 1000, 1100, 1200 and 1300 shown in FIG. 5-13 can be embodied as computer hardware circuitry or as a computer-readable program, or a combination of both. In other aspects, the systems and method described herein are implemented in an application service provider (ASP) system.

More specifically, in the computer-readable program aspect, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 1500 in FIG. 15, or on at least as many computers as there are components.

Figure 14:
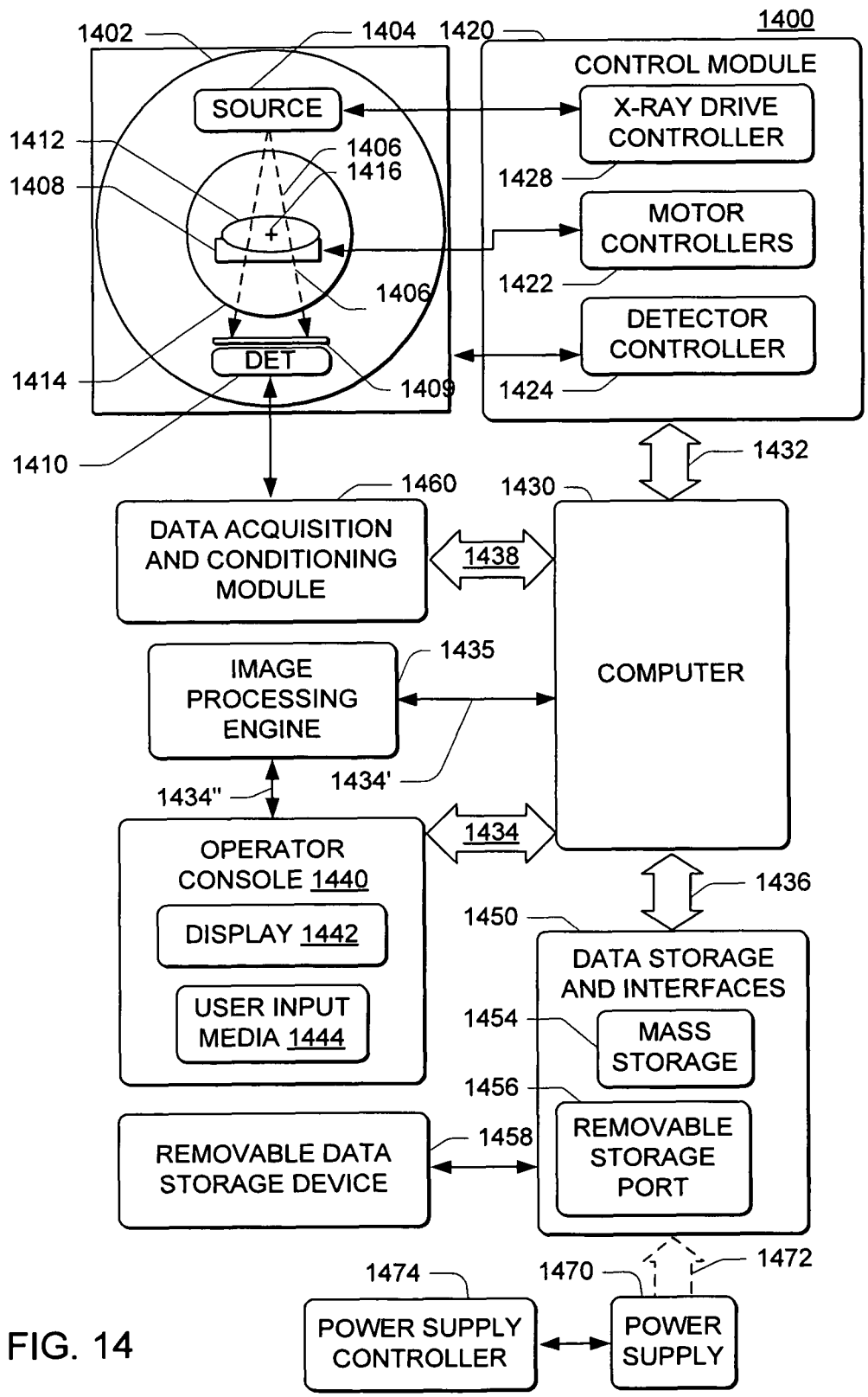
FIG. 14 is a block diagram of an aspect of a system configured to provide and then enhance two- or three-dimensional anatomical data in conformance with one or more purpose-specific applications.

FIG. 14 is a simplified diagram of an overview of a modified system 1400 configured to improve X-ray imaging operations. The system 1400 optionally includes a gantry 1402 or other support for an illumination source 1404, such as an X-ray illumination source, capable of providing illumination 1406, such as X-rays or other non-destructive internal imaging illumination, and can optionally include a test subject support 1408 that is transmissive with respect to the illumination 1406 and that is positioned above a scintillator 1409 and detector 1410 that is also opposed to the illumination source 1404. Alternatively, a direct conversion detector 1410 can be employed without need for a scintillator.

In one aspect, components of the system 1400 and a test subject 1412 are maintained in a defined geometric relationship to one another by the gantry 1402. A distance between the illumination source 1404 and the detector 1410 can be varied, depending on the type of examination sought, and the angle of the illumination 1406 respective to the test subject 1412 can be adjusted with respect to the body to be imaged responsive to the nature of imaging desired.

In one aspect, the test subject support 1408 is configured to support and/or cause controlled motion of the test subject 1412, such as a living human or animal patient, or other test subject 1412 suitable for non-destructive imaging, above the scintillator 1409/detector 1410 so that illumination 1407 is incident thereon after passing through the test subject 1412. In turn, information from the detector array 1410 describes internal aspects of the test subject 1412.

The scintillator 1409 can be a conventional CsI scintillator 1409, optically coupled to an array of photodiodes (not illustrated), such as a two-dimensional array of photodiodes and suitable control transistors formed using semiconductor material such as amorphous silicon, or any other form of detector 1410 suitable for use with the type or types of illumination 1406 being employed, such as X-rays. The detector elements are typically tesselated in a mosaic. The scintillator 1409 converts incident photons comprising electromagnetic radiation, such as X-rays, from high-energy, high-frequency photons 1407, into lower-energy, lower-frequency photons corresponding to spectral sensitivity of the detector elements, in a fashion somewhat analogous to fluorescence, as is commonly known in the context of many visible-light sources in use today. Alternatively, the detector 1410 can be formed as a flat-panel array including amorphous Silicon (α-Si) active elements, together with either a scintillator layer 1409, or a direct converter material such as Cadmium Zinc Telluride (CdZnTe), Mercuric Iodide ($HgI_2$), Lead Iodide ($PbI_2$), or amorphous Selenium (α-Se).

In some modes of operation, such as CT, the gantry 1402 and test subject support or table 1408 cooperatively engage to move the test subject 1412 longitudinally within an opening 1414, that is, along an axis 1416 extending into and out of the plane of FIG. 14. In some modes of operation, the gantry 1402 rotates the X-ray source 1404 and detector 1410 about the axis 1416, while the support 1408 moves longitudinally, to provide a helical series of scans of the test subject 1412, where a pitch of the helices is defined as a ratio of a longitudinal distance traveled by the table 1408 during a complete revolution of the gantry 1402, compared to a length of the detector 1410 along the axis 1416 of linear motion.

The system 1400 also optionally includes a control module or controller 1420. The controller 1420 can include a motor control module 1422 configured to move the test subject support 1408 and thus the test subject 1412 relative to the X-ray source 1404 and/or detector 1410, and can also control motors in the gantry 1402 or to position the X-ray illumination source 1404 relative to the test subject 1412 and/or the detector 1410.

The controller 1420 includes a detector controller 1424 configured to control elements within the detector 1410 and to facilitate data transfer therefrom. The controller 1420 also includes a drive parameter controller 1428 configured to control electrical drive parameters delivered to the X-ray source 1404. One or more computers 1430 provide connections to the controller 1420 via a bus 1432 configured for receiving data descriptive of operating conditions and configurations and for supplying appropriate control signals. Buses 1434, 1437 and 1439 act to transfer data and control signals, for example with respect to a module 1435, configured as an image processing engine, via interconnections such as 1437, 1439 that are configured for exchange of signals and data to and/or from the computer 1430 as well as other elements of the system 1400 and/or external computation or communications resources (not illustrated in FIG. 14).

The system 1400 also includes a bus 1436, a bus 1438 and an operator console 1440. The operator console 1440 is coupled to the system 1400 through the bus 1434. The operator console 1440 includes one or more displays 1442 and a user input interface 1444. The user input interface 1444 can include a touchscreen, keyboard, a mouse or other tactile input device, capability for voice commands and/or other input devices. The one or more displays 1442 provide video, symbolic and/or audio information relative to operation of system 1400, user-selectable options and images descriptive of the test subject 1412, and can display a graphical user interface for facilitating user selection among various modes of operation and other system settings.

The image processing engine 1435 facilitates automation of accurate measurement and assessment. The image processing engine 1435 is capable of forming multiple, coordinated images for display, for example via the monitor 1442, to provide the types of depictions described below. The image processing engine 1435 can comprise a separate and distinct module, which can include application-specific integrated circuitry, or can comprise one or more processors coupled with suitable computer-readable program modules, or can comprise a portion of the computer 1430 or other computation device.

The system 1400 also includes memory devices 1450, coupled via the bus 1436 to the computer 1430 through suitable interfaces. Datasets representing three-dimensional data and image or two-dimensional data typically conform to the digital imaging and communications in medicine (DICOM) standard, which is widely adopted for handling, storing, printing, and transmitting information in medical imaging. The DICOM standard includes a file format definition and a network communications protocol. The communication protocol is an application protocol that uses TCP/IP to communicate between systems. DICOM files can be stored in memory devices 1450 and retrieved therefrom, and can be exchanged between two entities that are capable of receiving image and patient data in DICOM format.

The memory devices 1450 include mass data storage capabilities 1454 and one or more removable data storage device ports 1456. The one or more removable data storage device ports 1456 are adapted to detachably couple to portable data memories 1458, which can include optical, magnetic and/or semiconductor memories and can have read and/or write capabilities, and which can be volatile or non-volatile devices or can include a combination of the preceding capabilities.

The system 1400 further includes a data acquisition and conditioning module 1460 that has data inputs coupled to the detector 1410 and that is coupled by the bus 1438 to the one or more computers 1430. The data acquisition and conditioning module 1460 includes analog to digital conversion circuitry for capturing analog data from the detector 1410 and then converting those data from the detector 1410 into digital form, to be supplied to the one or more computers 1430 for ultimate display via at least one of the displays 1442 and for potential storage in the mass storage device 1454 and/or data exchange with remote facilities (not shown in FIG. 14). The acquired image data can be conditioned in either the data acquisition and conditioning module 1460 or the one or more computers 1430 or both.

The system 1400 also includes a power supply 1470, coupled via interconnections represented as a power supply bus 1472, shown in dashed outline, to other system elements, and a power supply controller 1474. In some aspects, the system 1400 is configured to be a mobile system equipped with a portable power supply 1470, such as a battery. In other words, the system 1400 can comprise a wheeled unit and can be electromotively powered in self-contained fashion, lending physical agility to the ensemble of attributes offered by the system 1400.

Volumetric data collected via exposure of the test subject 1412 to suitable illumination 1406 can be processed via many different types of tools, each intended to enhance some portion of information content described by the data. One result can be inconsistency between analytical results from different types of signal processing tools, or between measurement results corresponding to different measurement times and/or measurement phases.

FIG. 15 illustrates an example of a general computer environment 1500 useful in the context of the environment of FIG. 14, in accordance with an aspect of the disclosed subject matter. The general computer environment 1500 includes a computation resource 1502 capable of implementing the processes described herein. It will be appreciated that other devices can alternatively used that include more components, or fewer components, than those illustrated in FIG. 15.

The illustrated operating environment 1500 is only one example of a suitable operating environment, and the example described with reference to FIG. 15 is not intended to suggest any limitation as to the scope of use or functionality of the aspects of this disclosure. Other well-known computing systems, environments, and/or configurations can be suitable for implementation and/or application of the subject matter disclosed herein.

The computation resource 1502 includes one or more processors or processing units 1504, a system memory 1506, and a bus 1508 that couples various system components including the system memory 1506 to processor(s) 1504 and other elements in the environment 1500. The bus 1508 represents one or more of any of several types of bus structures, including a memory bus or memory controller, a peripheral bus, an accelerated graphics port and a processor or local bus using any of a variety of bus architectures, and can be compatible with SCSI (small computer system interconnect), or other conventional bus architectures and protocols.

The system memory 1506 includes nonvolatile read-only memory (ROM) 1602 and random access memory (RAM) 1512, which can or can not include volatile memory elements. A basic input/output system (BIOS) 1514, containing the elementary routines that help to transfer information between elements within computation resource 1502 and with external items, typically invoked into operating memory during start-up, is stored in ROM 1510.

The computation resource 1502 further can include a non-volatile read/write memory 1516, represented in FIG. 15 as a hard disk drive, coupled to bus 1508 via a data media interface 1517 (e.g., a SCSI, ATA, or other type of interface); a magnetic disk drive (not shown) for reading from, and/or writing to, a removable magnetic disk 1520 and an optical disk drive (not shown) for reading from, and/or writing to, a removable optical disk 1526 such as a CD, DVD, or other optical media.

The non-volatile read/write memory 1516 and associated computer-readable media provide nonvolatile storage of computer-readable instructions, data structures, program modules and other data for the computation resource 1502. Although the exemplary environment 1500 is described herein as employing a non-volatile read/write memory 1516, a removable magnetic disk 1520 and a removable optical disk 1526, it will be appreciated by those skilled in the art that other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the non-volatile read/write memory 1516, magnetic disk 1520, optical disk 1526, ROM 1510, or RAM 1512, including an operating system 1530, one or more application programs 1532, other program modules 1534 and program data 1536. Examples of computer operating systems conventionally employed for some types of three-dimensional and/or two-dimensional medical image data include the NUCLEUS® operating system, the LINUX® operating system, and others, for example, providing capability for supporting application programs 1532 using, for example, code modules written in the C++® computer programming language.

A user can enter commands and information into computation resource 1502 through input devices such as input media 1538 (e.g., keyboard/keypad, tactile input or pointing device, mouse, foot-operated switching apparatus, joystick, touchscreen or touchpad, microphone, antenna etc.). Such input devices 1538 are coupled to the processing unit 1504 through a conventional input/output interface 1542 that is, in turn, coupled to the system bus. A monitor 1550 or other type of display device is also coupled to the system bus 1508 via an interface, such as a video adapter 1552.

The computation resource 1502 can include capability for operating in a networked environment (as illustrated in FIG. 14, for example) using logical connections to one or more remote computers, such as a remote computer 1560. The remote computer 1560 can be a personal computer, a server, a router, a network PC, a peer device or other common network node, and typically includes many or all of the elements described above relative to the computation resource 1502. In a networked environment, program modules depicted relative to the computation resource 1502, or portions thereof, can be stored in a remote memory storage device such as can be associated with the remote computer 1560. By way of example, remote application programs 1562 reside on a memory device of the remote computer 1560. The logical connections represented in FIG. 15 can include interface capabilities, e.g., such as interface capabilities 1452 (FIG. 14) a storage area network (SAN, not illustrated in FIG. 15), local area network (LAN) 1572 and/or a wide area network (WAN) 1574, but can also include other networks.

In certain aspects, the computation resource 1502 executes an Internet Web browser program (which can optionally be integrated into the operating system 1530), such as the "Internet Explorer®" Web browser manufactured and distributed by the Microsoft Corporation of Redmond, Wash.

When used in a LAN-coupled environment, the computation resource 1502 communicates with or through the local area network 1572 via a network interface or adapter 1576. When used in a WAN-coupled environment, the computation resource 1502 typically includes interfaces, such as a modem 1578, or other apparatus, for establishing communications with or through the WAN 1574, such as the Internet. The modem 1578, which can be internal or external, is coupled to the system bus 1508 via a serial port interface.

In a networked environment, program modules depicted relative to the computation resource 1502, or portions thereof, can be stored in remote memory apparatus. It will be appreciated that the network connections shown are exemplary, and other means of establishing a communications link between various computer systems and elements can be used.

A user of a computer can operate in a networked environment 1400 using logical connections to one or more remote computers, such as a remote computer 1560, which can be a personal computer, a server, a router, a network PC, a peer device or other common network node. Typically, a remote computer 1560 includes many or all of the elements described above relative to the computer 1500 of FIG. 15.

The computation resource 1502 typically includes at least some form of computer-readable media. Computer-readable media can be any available media that can be accessed by the computation resource 1502. By way of example, and not limitation, computer-readable media can comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 1502.

Communication media typically embodies computer-readable instructions, data structures, program modules or other data, represented via, and determinable from, a modulated data signal, such as a carrier wave or other transport mechanism, and includes any information delivery media. The term "modulated data signal" means a signal that has one or more of its characteristics set or changed in such a manner as to encode information in the signal in a fashion amenable to computer interpretation.

By way of example, and not limitation, communication media include wired media, such as wired network or direct-wired connections, and wireless media, such as acoustic, RF, infrared and other wireless media. The scope of the term computer-readable media includes combinations of any of the above.

The computer 1502 can function as one or more of the control segments of module 1420 (FIG. 14), the computer 1430, the operator console 1440 and/or the data acquisition and conditioning module 1460, for example, via implementation of the process 200 FIG. 2, respectively, as one or more computer program modules.

A technical effect of the aspects of the systems, methods and apparatus described herein include tunneling a single transmission control protocol Internet protocol (TCP/IP) port over a public networks without opening any incoming ports. Another technical effect includes secure networking over a public network by multiplexing all communication over a single TCP/IP port.

One of skill in the art will readily appreciate that the names of the methods and apparatus are not intended to limit aspects. Furthermore, additional methods and apparatus can be added to the components, functions can be rearranged among the components, and new components to correspond to future enhancements and physical devices used in aspects can be introduced without departing from the scope of aspects. One of skill in the art will readily recognize that aspects are applicable to future communication devices, different file systems, and new data types.

This written description uses examples to disclose the subject matter, including the best mode, and also to enable one skilled in the art to make and use the subject matter. The patentable scope of the subject matter is defined by the following claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A system comprising:
   a processor; and
   a storage device coupled to the processor comprising executable instructions capable of directing the processor to control:
   a tunnel layer that includes a multiplexing tunnel component and a hypertext transport protocol enterprise tunnel component that is operably coupled to the multiplexing tunnel component,
   wherein the hypertext transport protocol enterprise tunnel component includes a universal secure socket layer wrapper that is configured to secure communication through the tunnel layer,
   wherein the multiplexing tunnel component is configured to tunnel local clients communication to persistent remote access control services over a public network without opening any incoming ports.

2. The system of claim 1, wherein the multiplexing tunnel component is operable to:
   establish a connection over the public network between a plurality of computers by starting with the hypertext transport protocol enterprise tunnel component; and
   after the tunnel is established change the connection to a multiplexing protocol.

3. The system of claim 1, wherein the multiplexing tunnel component further comprises:
   multiplex communication on a connection over a single transmission control protocol Internet protocol port.

4. The system of claim 1, wherein the multiplexing tunnel component is operable to tunnel remote clients communication to persistent local access control services.

5. The system of claim 1, wherein the multiplexing tunnel component is operable to send event notifications between two MT components using a control channel.

6. A method to provide secure communications between a plurality of computers over a public network, the method comprising:
   establishing a connection over the public network between the plurality of computers by using a hypertext transport protocol enterprise tunnel protocol;
   changing a protocol of the connection to a multiplexing protocol; and
   multiplexing communication on the connection over a single transmission control protocol Internet protocol port by tunneling local clients communication to remote services over the public network without opening any incoming ports, wherein the remote services comprise one or both of a Telnet service or a virtual network computing (VNC) service.

7. The method of claim 6, wherein establishing the connection further comprises:
   sending a first buffer as a handshake authentication, the first buffer including a signature and version information.

8. The method of claim 6, comprising:
   respectively associating a plurality of local sockets with a plurality of channel numbers of the connection, wherein the plurality of channel numbers respectively correspond to a plurality of channels; and
   maintaining a mapping between the plurality of local sockets and the plurality of channel numbers wherein.

9. The method of claim 8, wherein the plurality of channels includes a control channel.

10. The method of claim 8, wherein:
    reading data on the local socket from a first of the plurality of computers,
    transmitting the data with a header to a second of the plurality of computers, the header including the channel number and a buffer size; and
    the transmitted data is decoded by the second of the plurality computers, and the decoded data is written by the second of the plurality computers to an appropriate local socket according to the channel number.

11. The method of claim 6, wherein the changing is performed by a multiplexing tunnel data source.

12. The method of claim 11, wherein the multiplexing tunnel data source performs:
    launching a communication tool without waiting for establishment of additional tunnels.

13. A non-transitory computer-accessible medium to secure communications over a public network, the medium comprising:
    a component that is compliant with a hypertext transport protocol enterprise tunnel protocol; and
    a non-transitory component configured to couple to the hypertext transport protocol enterprise tunnel and configured to establish a persistent connection over the public network between a plurality of computers by using the hypertext transport protocol enterprise tunnel protocol, the non-transitory component configured to switch the connection to a multiplexing protocol, thereby tunneling a single transmission control protocol Internet protocol port over the public network without opening an incoming port.

14. The medium of claim 13, wherein the non-transitory component comprises:
    a multiplexing tunnel data source operable to couple to the hypertext transport protocol enterprise tunnel and operable to establish the connection over the public network between the plurality of computers by mimicking the hypertext transport protocol enterprise tunnel protocol and operable to switch the connection to the multiplexing protocol.

15. The medium of claim 13, wherein the medium is operable to control:
    a tunnel layer,
    wherein the tunnel layer includes a multiplexing tunnel and a hypertext transport protocol enterprise tunnel coupled to the multiplexing tunnel.

16. The medium of claim 13, wherein the multiplexing protocol includes a plurality of packets, and wherein each of the plurality of packets comprises two bytes for channel number and two bytes for buffer size and data.

17. The system of claim 1, wherein the tunnel layer does not comprise virtual private network (VPN) Internet protocol security (IPSEC), OpenVPN, or a secure shell (SSH).

18. The system of claim 1, wherein the multiplexing tunnel component is configured to provide up to 65534 sockets to tunnel local clients communication to remote services over the public network without opening any incoming ports.

19. The system of claim 1, wherein the persistent remote access control services comprise virtual network computing (VNC) services, Telnet services, or a combination thereof.

20. The system of claim 4, wherein the persistent local access control services comprise virtual network computing (VNC) services, Telnet services, or a combination thereof.

* * * * *